United States Patent
Shi et al.

(10) Patent No.: US 10,262,399 B2
(45) Date of Patent: Apr. 16, 2019

(54) IMAGE DENOISING WITH COLOR-EDGE CONTRAST PRESERVING

(71) Applicant: Samsung Electronics Co., Ltd., Suwon-si, Gyeonggi-do (KR)

(72) Inventors: Lilong Shi, Austin, TX (US); Ilia Ovsiannikov, Studio City, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 144 days.

(21) Appl. No.: 15/458,020

(22) Filed: Mar. 13, 2017

(65) Prior Publication Data

US 2018/0197277 A1    Jul. 12, 2018

Related U.S. Application Data

(60) Provisional application No. 62/444,359, filed on Jan. 9, 2017.

(51) Int. Cl.
| | | |
|---|---|---|
| *G06K 9/00* | (2006.01) | |
| *G06T 5/00* | (2006.01) | |
| *G06T 3/40* | (2006.01) | |

(52) U.S. Cl.
CPC ............ *G06T 5/002* (2013.01); *G06T 3/4015* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 8,254,718 B2 | 8/2012 | Bennett et al. | |
| 9,135,681 B2 | 9/2015 | Tomaselli et al. | |
| 2009/0285480 A1* | 11/2009 | Bennett | G06K 9/40 382/167 |
| 2013/0242148 A1* | 9/2013 | Mlinar | H04N 9/045 348/279 |
| 2016/0284065 A1 | 9/2016 | Cohen | |
| 2016/0300870 A1 | 10/2016 | Keelan et al. | |

* cited by examiner

*Primary Examiner* — Sean M Conner
(74) *Attorney, Agent, or Firm* — Renaissance IP Law Group LLP

(57) ABSTRACT

A color-edge contrast preserver includes a demosaicing module, a color-correcting module, a converter module and a chromatic-denoising module. The demosaicing module may demosaic a red-white-blue (RWB) pixel image of the image. The color-correcting module may color correct the demosaiced RWB pixel image and may produce a red-green-blue (RGB) pixel image from the color-corrected demosaiced RWB pixel image. The converter module to convert the RGB pixel image to a hue-saturation-value (HSV) pixel image and to generate a similarity kernel $\Delta Y$. The chromatic-denoising module may denoise a red pixel image and a blue pixel image of the RWB pixel image using the similarity kernel $\Delta Y$.

17 Claims, 4 Drawing Sheets

IMAGE DENOISING WITH COLOR-EDGE CONTRAST PRESERVING

CROSS-REFERENCE TO RELATED APPLICATION

This patent application claims the priority benefit under 35 U.S.C. § 119(e) of U.S. Provisional Patent Application No. 62/444,359, filed on Jan. 9, 2017, the disclosure of which is incorporated herein by reference in its entirety.

TECHNICAL FIELD

The subject matter disclosed herein generally relates to image signal processing, and more particularly, to an apparatus and method to provide image denoising with color-edge contrast preserving.

BACKGROUND

Red-White-Blue (RWB) sensors have recently been developed and used in commercial products, such as cellphones. RWB sensors provide an advantage of for reducing low light noise (i.e., approximately +3 dB increase in SNR). A denoising technique, known as Chromatic Denoising or as Clarity+ Denoising, is used on the output of a RWB sensor. While greatly removing image noise, the denoising technique unfortunately also blurs edges across two different colors, thereby reducing color-edge contrast of the image. Other image sensors that use broadband filters, such as a color-splitter filter, may also exhibit similar problem, although not as severe.

SUMMARY

An example embodiment provides a system to preserve color-edge contrasts of an image in which the system may include a demosaicing module, a color-correcting module, a converter module and a chromatic-denoising module. The demosaicing module may demosaic a red-white-blue (RWB) pixel image of the image. The color-correcting module may color correct the demosaiced RWB pixel image and may produce a red-green-blue (RGB) pixel image from the color-corrected demosaiced RWB pixel image. The converter module to convert the RGB pixel image to a hue-saturation-value (HSV) pixel image and to generate a similarity kernel $\Delta Y$. The chromatic-denoising module may denoise a red pixel image and a blue pixel image of the RWB pixel image using the similarity kernel $\Delta Y$. In one embodiment, the similarity kernel $\Delta Y$ may be:

$$\Delta Y = \alpha \Delta H + \beta \Delta S + \gamma \Delta V,$$

in which, $$\Delta H = \min \begin{Bmatrix} (h_1 - h_2) \bmod 360 \\ (h_1 + 360 - h_2) \bmod 360 \\ (h_2 - h_1) \bmod 360 \\ (h_2 + 360 - h_1) \bmod 360 \end{Bmatrix},$$

$$\alpha + \beta + \gamma = 1,$$

$h_1$ is a hue value of a pixel $p_1$ at the center of the similarity kernel that is of size M×M, and $h_2$ is a hue value of a pixel $p_2$ neighboring pixel $p_1$ and may be any pixel in the M×M pixels neighboring $p_1$, $$\Delta S = \|s_1 - s_2\|,$$

in which $s_1$ is a saturation value of pixel $p_1$, and $s_2$ is a saturation value of pixel $p_2$, $$V = \|v_1 - v_2\|,$$

in which $v_1$ is a brightness value of pixel $p_1$, and $v_2$ is a brightness value of pixel $p_2$.

An example embodiment provides a method to preserve color-edge contrasts of an image in which method may include: demosaicing an RWB pixel image of the image; producing an RGB image by color correcting the demosaiced RWB pixel image; converting the RGB image to an HSV image; generating a similarity kernel $\Delta Y$ from the HSV image; and de-noising a red pixel image and a blue pixel image of the RWB pixel image using the similarity kernel $\Delta Y$.

An example embodiment provides a system to preserve color-edge contrasts of an image in which the system may include a raw-image receiver, a demosaicing module, a color-correcting module, a converter module, and a chromatic-denoising module. The raw-image receiver may receive an RWB image. The demosaicing module may demosaic the RWB pixel image of the image. The color-correcting module may color correct the demosaiced RWB pixel image and to produce a RGB pixel image from the color-corrected demosaiced RWB pixel image. The converter module may convert the RGB pixel image to an HSV pixel image and to generate a similarity kernel $\Delta Y$. The chromatic-denoising module may denoise a red pixel image and a blue pixel image of the RWB pixel image using the similarity kernel $\Delta Y$.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
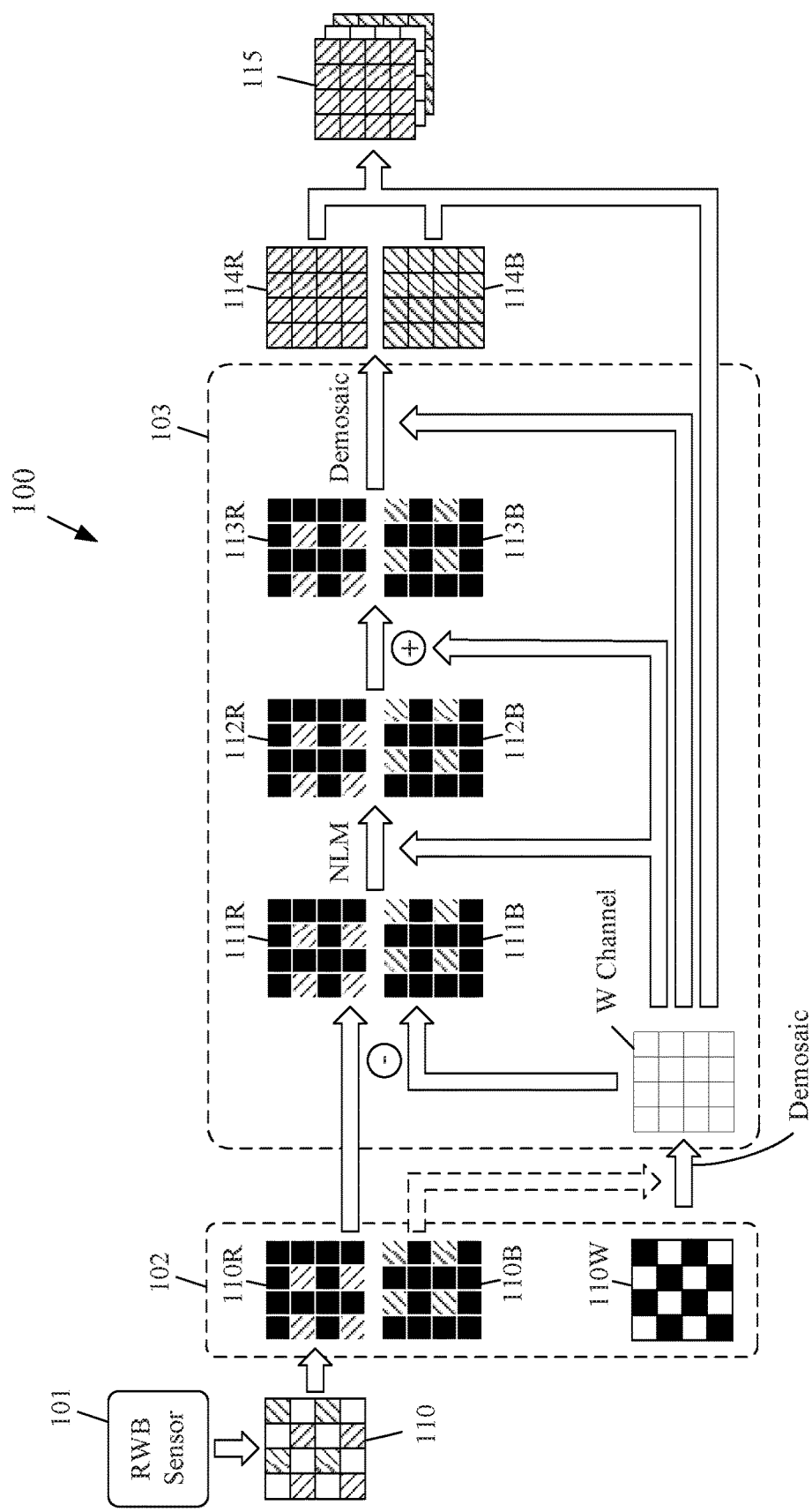
FIG. 1 depicts a functional block diagram of a portion of an image signal processor having a conventional chromatic-denoising module.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides a color-edge-preserving denoising technique that is for RWB and other broadband image sensors. That is, the subject matter disclosed herein preserves (and in some cases enhances) color-edge contrast while removing noise. In one embodiment, parameters of the color-edge-preserving denoising technique may be tuned to control the degree of color edge contrast and noise level.

FIG. 1 depicts a functional block diagram of a portion of an image signal processor (ISP) 100 having a conventional chromatic-denoising module 103. As depicted in FIG. 1, an RWB image sensor 101 senses an image and outputs a raw RWB pixel image 110. The RWB pixel image 110 is received by an image preprocessing module 102. The image preprocessing module 102 may provide some preprocessing, such as bad-pixel correction, white-balance, etc., but no demosaicing yet has been applied so each pixel contains a single color. The image preprocessing module 102 separates the RWB pixel image 110 into a red pixel image 110R, a blue pixel image 110B, and a white pixel image 110W. The white pixel image 110W is reconstructed and demosaiced, which also may be referred to as a Luma channel (Y).

The red pixel image 110R, the blue pixel image 110B, and the white pixel image 110W are received by the conventional chromatic-denoising module 103. The reconstructed white channel W is subtracted from both the red pixel image 110R and the blue pixel image 110B to respectively form a red pixel image 111R and a blue pixel image 111B. A non-local means (NLM) process denoises both the red pixel image 111R and the blue pixel image 111B using the reconstructed white channel W to respectively form a red channel 112R and a blue channel 112B. The reconstructed white channel W is then added to both the red channel 112R and the blue channel 112B to respectively form a red channel 113R and a blue channel 113B. Both the red channel 113R and the blue channel 113B are demosaiced using the reconstructed white channel W to respectively form a chromatically denoised red channel 114R and a chromatically denoised blue channel 114B. The reconstructed white channel W is then used to form a chromatically denoised RWB pixel image 115. The conventional chromatic-denoising module 103 removes a significant amount of noise, but also blurs edges across two different colors so that color-edge contrast of the image has been reduced.

Figure 2:
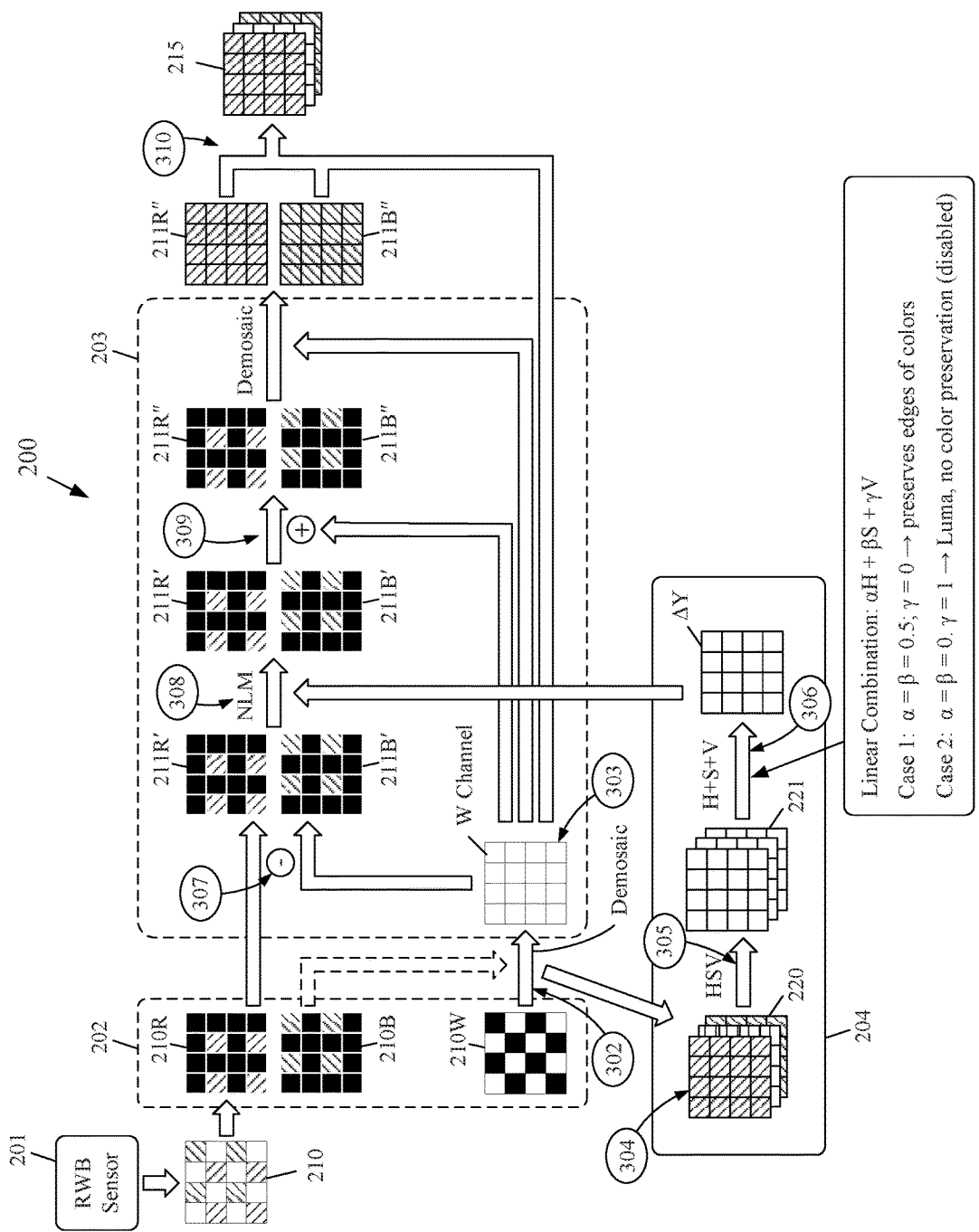
FIG. 2 depicts a functional block diagram of a portion of an image signal processor having a chromatic-denoising module and a color-contrast preserving module according to the subject matter disclosed herein.
Figure 3:
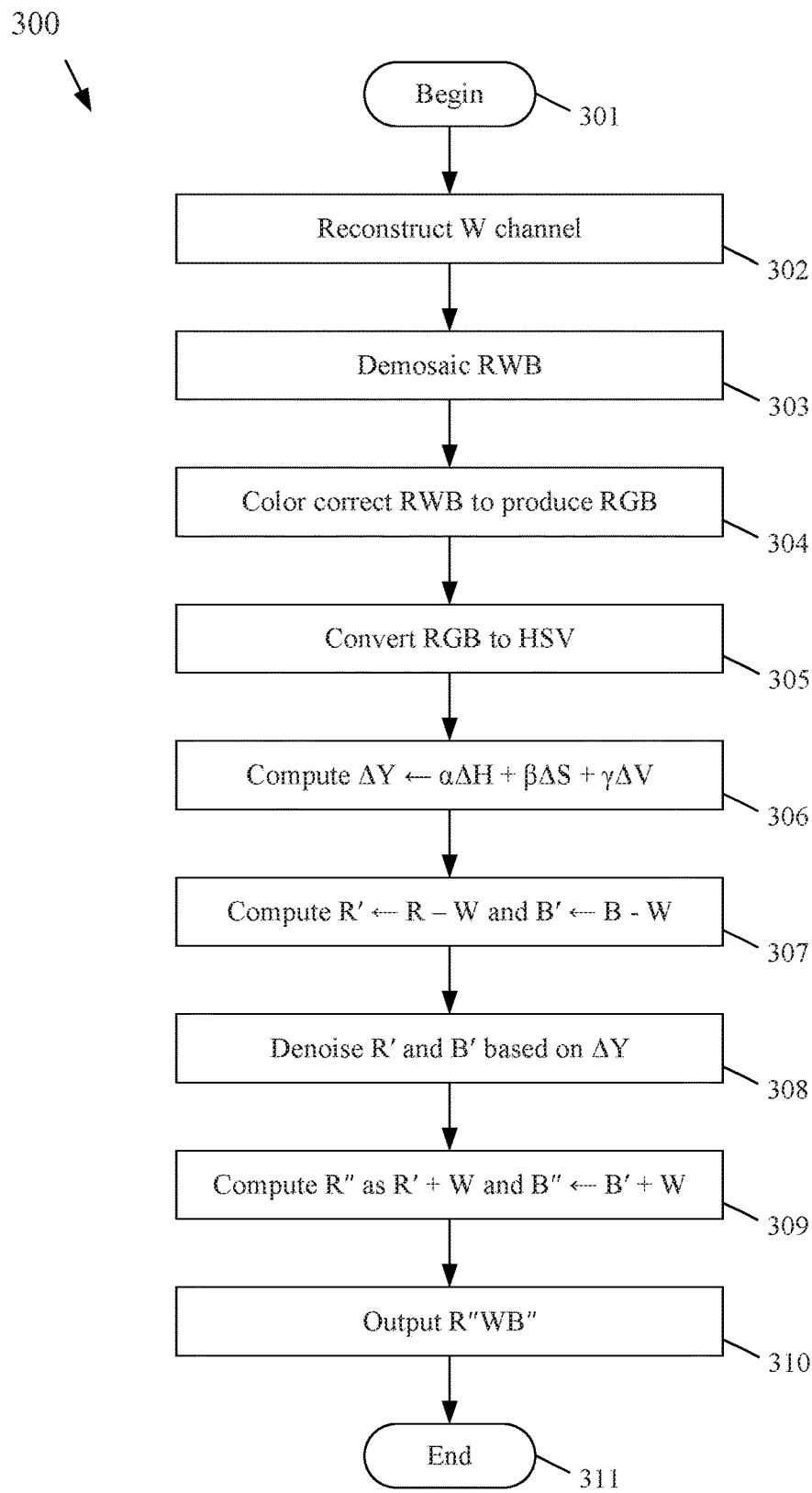
FIG. 3 depicts a flow diagram of an example embodiment of a method to denoise a RWB pixel image while preserving color-contrast according to the subject matter disclosed herein.

FIG. 2 depicts a functional block diagram of a portion of an ISP 200 having a chromatic-denoising module 203 and a color-contrast preserving module 204 according to the subject matter disclosed herein. It should be noted that the image preprocessing module 202, the chromatic-denoising module 203, and the color-contrast preserving module 204 may, collectively or individually, be embodied as software, firmware and/or hardware that forms part of a larger system, such as, but not limited to, an IC, SoC and so forth. FIG. 3 depicts a flow diagram of an example embodiment of a method 300 to denoise a RWB pixel image while preserving color-contrast according to the subject matter disclosed herein.

As depicted in FIG. 2, an RWB image sensor 201 senses an image and outputs a raw (unprocessed) RWB pixel image 210. The RWB pixel image 210 is received by an image preprocessing module 202. The image preprocessing module 202 may provide some preprocessing, such as bad-pixel correction, white-balance, etc., but no demosaicing has yet been applied so each pixel contains a single color. The image preprocessing module 202 separates the RWB pixel image 210 into a red pixel image 210R, a blue pixel image 210B, and a white pixel image 210W. At 301 in FIG. 3, the image denoising with color-edge contrast preserving process disclosed herein begins. At 302 in FIG. 3, the white pixel image 210W is reconstructed and demosaiced at 303. The reconstructed white pixel image 210W may also be referred to as a Luma channel (Y).

At 304, the reconstructed and demosaiced white channel W is color corrected by the color-contrast preserving module 204 to form a RGB pixel image 220. At 305, the RGB pixel image 220 is transformed from the RGB color space to become a hue-saturation-value (HSV) pixel image 221. The HSV pixel image is used to determine a similarity kernel $\Delta Y$ at 306. The similarity kernel $\Delta Y$ will be used by the chromatic-denoising module 203 instead of the reconstructed white channel during a NLM process during the chromatic denoising.

In one embodiment, the similarity kernel $\Delta Y$ is determined as $$\Delta Y = \alpha \Delta H + \beta \Delta S + \gamma \Delta V, \quad (1)$$

in which, $$\Delta H = \min \begin{pmatrix} (h_1 - h_2) \bmod 360 \\ (h_1 + 360 - h_2) \bmod 360 \\ (h_2 - h_1) \bmod 360 \\ (h_2 + 360 - h_1) \bmod 360 \end{pmatrix},$$

$$\alpha + \beta + \gamma = 1,$$

$h_1$ is the hue value of a pixel $p_1$ at the center of the similarity kernel that is of size M×M, and $h_2$ is the hue value of a pixel $p_2$ neighboring the pixel $p_1$ and may be any pixel in the M×M pixels neighboring the pixel $p_1$, $$\Delta S = \|s_1 - s_2\|,$$

in which $s_1$ is the saturation value of the pixel $p_1$, $s_2$ is the saturation value of the pixel $p_2$, $$\Delta V = \|v_1 - v_2\|,$$

in which $v_1$ is the brightness value of the pixel $p_1$, and $v_2$ is the brightness value of the pixel $p_2$. It should be noted that there is no need to take the absolute value of $\Delta H$ because $\Delta H$ is non-negative by definition.

As indicated by Equation (1), the variables $\alpha$, $\beta$ and $\gamma$ are linearly related by the constraint $\alpha + \beta + \gamma = 1$. There are two general cases for which the values for the coefficients $\alpha$, $\beta$ and $\gamma$ may be simply defined. In the first case, $\alpha = \beta = 0.5$, and $\gamma = 0$. In this case, the color edges are preserved and would normally be used. In the second case, $\alpha = \beta = 0$, and $\gamma = 1$. In this case, the color edge preservation is disabled and would be used for a low-lighting situation.

Referring back to FIG. 2, the red pixel image 210R, the blue pixel image 210B, and the white pixel image 210W are received by the chromatic-denoising module 203. At 307 in FIG. 3, the chromatic-denoising module 203 subtracts the white channel W from both the red pixel image 210R and the blue pixel image 210B to respectively form a red pixel image 211R and a blue pixel image 211B'. At 308, an NLM process uses the similarity kernel $\Delta Y$ is used to denoise both the red pixel image 211R' and the blue pixel image 211B' to respectively form a red channel 211R' and a blue channel 211B'. At 309, the reconstructed white channel W is then added to both the red channel 211R' and the blue channel 211B' to respectively form a red channel 211R" and a blue channel 211B". Both the red channel 211R" and the blue channel 211B" are demosaiced using the reconstructed white channel W to respectively form a chromatically denoised red channel 211R" and a chromatically denoised blue channel 211B". At 310, the reconstructed white channel W is then used to output a chromatically denoised R"WB" pixel image 215. The process ends at 311.

Figure 4:
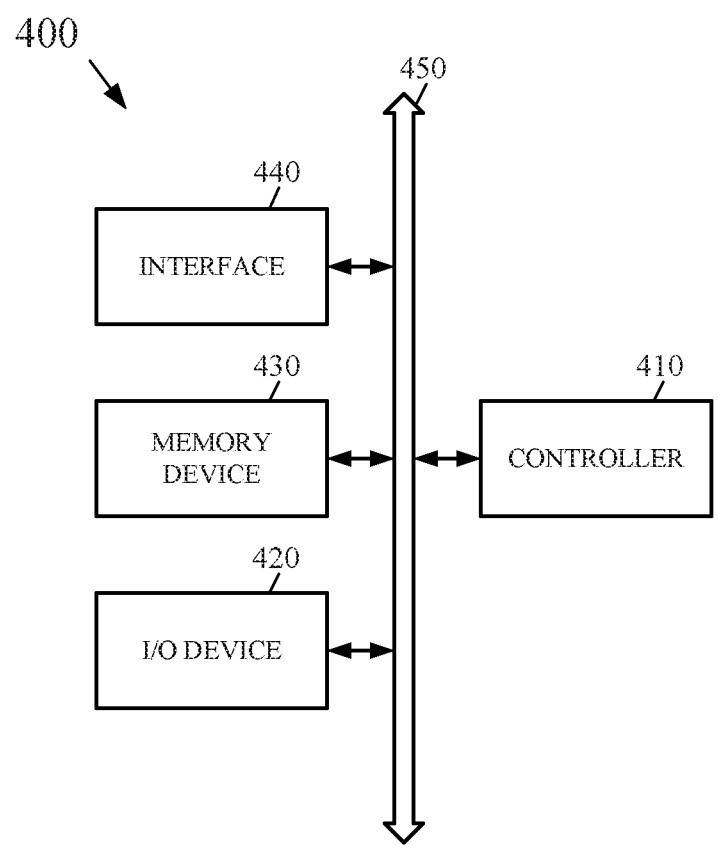
FIG. 4 depicts an electronic device that comprises one or more integrated circuits (chips) comprising an image denoiser with color-edge contrast preservation according to the subject matter disclosed herein.

FIG. 4 depicts an electronic device 400 that comprises one or more integrated circuits (chips) comprising an image denoiser with color-edge contrast preservation according to the subject matter disclosed herein. Electronic device 400 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 400 may comprise a controller 410, an input/output device 420 such as, but not limited to, a keypad, a keyboard, a display, a touch-screen display, a camera, and/or an image sensor, a memory 430, and an interface 440 that are coupled to each other through a bus 450. The controller 410 may comprise, for example, at least one microprocessor, at least one digital signal process, at least one microcontroller, or the like. The memory 430 may be configured to store a command code to be used by the controller 410 or a user data. Electronic device 400 and the various system components comprising electronic device 400 may comprise an image denoiser with color-edge contrast preservation according to the subject matter disclosed herein. The interface 440 may be configured to include a wireless interface that is configured to transmit data to or receive data from a wireless communication network using a RF signal. The wireless interface 440 may include, for example, an antenna, a wireless transceiver and so on. The electronic system 400 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system to preserve color-edge contrasts of an image, the system comprising:
   a demosaicing module to demosaic a red-white-blue (RWB) pixel image of the image;

a color-correcting module to color correct the demosaiced RWB pixel image and to produce a red-green-blue (RGB) pixel image from the color-corrected demosaiced RWB pixel image;
a converter module to convert the RGB pixel image to a hue-saturation-value (HSV) pixel image and to generate a similarity kernel $\Delta Y$; and
a chromatic-denoising module to denoise a red pixel image and a blue pixel image of the RWB pixel image using the similarity kernel $\Delta Y$,
wherein the similarity kernel $\Delta Y$ comprises:

$$\Delta Y = \alpha \Delta H + \beta \Delta S + \gamma \Delta V,$$

in which, $$\Delta H = \min \begin{pmatrix} (h_1 - h_2) \bmod 360 \\ (h_1 + 360 - h_2) \bmod 360 \\ (h_2 - h_1) \bmod 360 \\ (h_2 + 360 - h_1) \bmod 360 \end{pmatrix},$$

$$\alpha + \beta + \gamma = 1,$$

$h_1$ is a hue value of a pixel $p_1$ at the center of the similarity kernel that is of size M×M, and $h_2$ is a hue value of a pixel $p_2$ neighboring the pixel $p_1$ and may be any pixel in the M×M pixels neighboring the pixel $p_1$, $$\Delta S = \|s_1 - s_2\|,$$

in which $s_1$ is a saturation value of the pixel $p_1$, and $s_2$ is a saturation value of the pixel $p_2$, $$\Delta V = \|v_1 - v_2\|,$$

in which $v_1$ is a brightness value of the pixel $p_1$, and $v_2$ is a brightness value of the pixel $p_2$.

2. The system of claim 1, wherein $\alpha=\beta=0.5$ and $\gamma=0$.

3. The system of claim 1, wherein $\alpha=\beta=0$ and $\gamma=1$.

4. The system of claim 1, wherein $\alpha=0$ and $\gamma=1$, if S<0.3.

5. The system of claim 1, wherein the chromatic-denoising module is to further form a reconstructed white W channel from RWB pixel image of the image, and to form a R' channel and a B' channel.

6. The system of claim 1, wherein the chromatic-denoising module de-noises the red pixel image and the blue pixel image of the RWB pixel image with the similarity kernel $\Delta Y$ using a non-local means technique.

7. The system of claim 1, wherein the system is part of a camera.

8. The system of claim 1, wherein the system is part of a smartphone.

9. A method to preserve color-edge contrasts of an image, the method comprising:
demosaicing a red-white-blue (RWB) pixel image of the image;
producing a red-green-blue (RGB) image by color correcting the demosaiced RWB pixel image;
converting the RGB image to a hue-saturation-value (HSV) image;
generating a similarity kernel $\Delta Y$ from the HSV image; and
de-noising a red pixel image and a blue pixel image of the RWB pixel image using the similarity kernel $\Delta Y$,
wherein the similarity kernel comprises:

$$\Delta Y = \alpha \Delta H + \beta \Delta S + \gamma \Delta V,$$

in which, $$\Delta H = \min \begin{pmatrix} (h_1 - h_2) \bmod 360 \\ (h_1 + 360 - h_2) \bmod 360 \\ (h_2 - h_1) \bmod 360 \\ (h_2 + 360 - h_1) \bmod 360 \end{pmatrix},$$

$$\alpha + \beta + \gamma = 1,$$

$h_1$ is a hue value of a pixel $p_1$ at the center of the similarity kernel that is of size M×M, and $h_2$ is a hue value of a pixel $p_2$ neighboring the pixel $p_1$ and may be any pixel in the M×M pixels neighboring the pixel $p_1$, $$\Delta S = \|s_1 - s_2\|,$$

in which $s_1$ is a saturation value of the pixel $p_1$, $s_2$ is a saturation value of the pixel $p_2$, $$\Delta V = \|v_1 - v_2\|,$$

in which $v_1$ is a brightness value of the pixel $p_1$, and $v_2$ is a brightness value of the pixel $p_2$.

10. The method of claim 9, wherein $\alpha=\beta=0.5$ and $\gamma=0$.

11. The method of claim 9, wherein $\alpha=\beta=0$ and $\gamma=1$.

12. The method of claim 9, wherein $\alpha=0$ and $\gamma=1$, if S<0.3.

13. The method of claim 9, wherein de-noising the red pixel image and a blue pixel image of the RWB pixel image using the similarity kernel $\Delta Y$ comprises using a non-local means technique.

14. A system to preserve color-edge contrasts of an image, the system comprising:
a raw-image receiver to receive a red-white-blue (RWB) image;
a demosaicing module to demosaic the red-white-blue (RWB) pixel image of the image;
a color-correcting module to color correct the demosaiced RWB pixel image and to produce a red-green-blue (RGB) pixel image from the color-corrected demosaiced RWB pixel image;
a converter module to convert the RGB pixel image to a hue-saturation-value (HSV) pixel image and to generate a similarity kernel $\Delta Y$; and
a chromatic-denoising module to denoise a red pixel image and a blue pixel image of the RWB pixel image using the similarity kernel $\Delta Y$,
wherein the similarity kernel $\Delta Y$ comprises:

$$\Delta Y = \alpha \Delta H + \beta \Delta S + \gamma \Delta V,$$

in which, $$\Delta H = \min \begin{pmatrix} (h_1 - h_2) \bmod 360 \\ (h_1 + 360 - h_2) \bmod 360 \\ (h_2 - h_1) \bmod 360 \\ (h_2 + 360 - h_1) \bmod 360 \end{pmatrix},$$

$$\alpha + \beta + \gamma = 1,$$

$h_1$ is a hue value of a pixel $p_1$ at the center of the similarity kernel that is of size M×M, and $h_2$ is a hue value of a pixel $p_2$ neighboring the pixel $p_1$ and may be any pixel in the M×M pixels neighboring the pixel $p_1$, $$\Delta S = \|s_1 - s_2\|,$$

in which $s_1$ is a saturation value of the pixel $p_1$, and $s_2$ is a saturation value of the pixel $p_2$, $$\Delta V = \|v_1 - v_2\|,$$

in which $v_1$ is a brightness value of the pixel $p_1$, and $v_2$ is a brightness value of the pixel $p_2$.

15. The system of claim 14, wherein $\alpha=\beta=0.5$ and $\gamma=0$.

16. The system of claim 14, wherein $\alpha=\beta=0$ and $\gamma=1$.

17. The system of claim 14, wherein the system is part of a camera or a smartphone.

* * * * *